United States Patent [19]

Kaminski

[11] Patent Number: 5,071,291
[45] Date of Patent: Dec. 10, 1991

[54] INTERNAL DISK MILLING CUTTER WITH IMPROVED CUTTER INSERT

[75] Inventor: Brian D. Kaminski, Lake Orion, Mich.

[73] Assignee: General Motors Corporation, Detroit, Mich.

[21] Appl. No.: 594,469

[22] Filed: Oct. 9, 1990

Related U.S. Application Data

[63] Continuation of Ser. No. 279,385, Dec. 2, 1988, abandoned.

[51] Int. Cl.⁵ .............................................. B26D 1/12
[52] U.S. Cl. ....................................... 407/30; 407/33; 407/113; 407/114
[58] Field of Search ...................... 407/30, 12, 33, 40, 407/113, 114, 42, 46, 51

[56] References Cited

U.S. PATENT DOCUMENTS

| | | | |
|---|---|---|---|
| 2,870,523 | 1/1959 | Richard | 407/43 |
| 4,488,839 | 12/1984 | Wermeister et al. | 407/43 |
| 4,784,534 | 11/1988 | Kaminski et al. | 407/19 |

*Primary Examiner*—James G. Smith
*Assistant Examiner*—Lawrence Cruz
*Attorney, Agent, or Firm*—Patrick M. Griffin

[57] ABSTRACT

An internal disk milling cutter has a pair of cutting edges swept back symmetrically from a forwardmost cutting corner, and a concave upper surface behind the cutting edges, so that the insert may be oriented on the cutter body in such a way as to provide a low force, skiving action.

3 Claims, 4 Drawing Sheets

INTERNAL DISK MILLING CUTTER WITH IMPROVED CUTTER INSERT

This application is a continuation of application Ser. No. 279,385 now abandoned, filed Dec. 2, 1988.

This invention relates to internal disk milling cutters generally, and specifically to such a cutter with an improved cutter insert.

BACKGROUND OF THE INVENTION

Several alternative methods are known for machining a workpiece cylindrical surface, such as the main journal on a vehicle crank shaft, from a rough to a finished diameter. In some methods, such as plunge turning or turn broaching, the workpiece is spun about its axis, and the tool is moved into the spinning surface. When it is not practical or desirable to spin the workpiece, it may be held stationary, and the tool spun and moved into the workpiece instead.

This is what is done in a method of milling known as internal disk milling. A ring shaped cutter body has an internal diameter that is substantially larger than the workpiece surface to be machined. Mounted to the inner surface of the cutter body are a plurality of evenly circumferentially spaced cutter inserts located at the same radius and in the same orientation. The workpiece is moved through the cutter body until the surface to be machined is aligned with the inserts, then held stationary. Then, the cutter is operated by spinning the cutter body with its axis parallel to the axis of the workpiece surface, and initially plunged by moving it toward the workpiece, keeping the two axes parallel. Each insert, therefore, moves in a short cutting arc relative to the workpiece surface as it cuts. The plunging motion is stopped when the finished diameter is reached, although only as much of the workpiece surface as the cutting arc of the inserts overlaps will have been machined off. Finally, the axis of the still spinning cutter body is orbited around the axis of the workpiece until the entire surface of the workpiece is machined down to the finished diameter.

An example of a conventional cutter insert used in an internal disk milling cutter may be seen U.S. Pat, No. 4,488,839 to Wermeister et al. The cutter insert 8 is a constant thickness wafer with flat sides that is mounted to the cutter body so as to present one of its straight cutting edge basically perpendicular to its cutting arc direction. The insert may be turned or indexed so as to present new edges to the workpiece with wear. In some cases, polygonal inserts are used, which have a greater number of usable straight cutting edges. The advantage of orienting a straight cutting edge perpendicular to the direction of its cutting arc is that the insert basically pivots about the line of the cutting edge as it moves through its cutting arc. Therefore, the cutting edge does not change its effective orientation relative to the cut surface, and a suitably flat sided cylindrical machined surface results. The big disadvantage of a straight cutting edge so oriented is that it cuts a chip from the workpiece surface that is as wide as the edge is long, creating a high cutting force and edge wear.

Another basic type of surface milling, known as skiving, reduces edge loading by using a diamond shaped insert with a pair of straight cutting edges disposed in a V. The corner of the V contacts the machined surface first, followed by the side edges of the V, which plows the metal to each side. This creates a continuously thinner chip, with consequently less cutting force. The insert has a planar, flat external surface trailing the cutting edges, but is simply tipped back at a suitable clearance angle so that the flat trailing surface does not drag on the machined piece. However, this conventional insert design works well only when it contacts the machined surface in an orientation that basically does not change during the time that the insert sees the workpiece, as is the case in turn broaching or pull broaching. In internal disk milling, where the insert moves through a cutting arc and continuously changes its orientation relative to the machined surface, such a conventional skiving insert, even if tipped back at a clearance angle, would dig into the machined surface and leave a V-shaped trough, rather than a straight sided, "flat" cylindrical surface. It is not immediately obvious how a skiving type cutter insert could be shaped or oriented so as to work properly on an internal milling disk cutter body, which is why the high edge loading of the straight cutting edge has been tolerated.

SUMMARY OF THE INVENTION

The cutter of the invention has a conventional cutter body that is operated in the same way, and on the same type of workpiece, as that described above. Each of the cutter inserts of the invention is also mounted to the cutter body at even circumferential locations and at the same radius relative to axis of the cutter body. However, each of the cutter inserts of the invention has a new shape and a specific orientation on the cutter body that cooperate so as to create a skiving action, while still leaving a suitably flat sided cylindrical surface.

Rather than a flat external surface, the cutter insert of the invention has a general wedge shape with an upper surface that is ground or otherwise formed so as to be concave, thereby creating a pair of coplanar cutting edges that sweep back symmetrically from a forward-most cutting corner or point. The cutter insert is mounted to the cutter body in an orientation that puts the cutting corner on a central plane of the cutter body that is normal to the axis of the cutter body. The insert orientation also locates the cutting edges such that they are substantially perpendicularly bisected by a radial plane through the cutter body axis. More particularly, in the preferred embodiment disclosed, the upper surface of the insert is comprised of a pair of flat, triangular top faces that slope down at a shallow angle to the center of the insert. The pair of cutting edges thereby created are generally V-shaped and coplanar.

When the cutter is operated as described, the cutting edges, because of their orientation, remain substantially tangent to the surface that they are cutting. The concavity of the upper surface of the insert trailing the cutting edges is sufficient to clear the cut surface, without interference or drag. Given their general V shape, the cutting edges create a skiving action with a continuously thinner, lower force chip. But, because of their orientation and the way in which they move relative to the cut surface, the cutting edges create a suitable journal surface. In addition, in the preferred embodiment, the cutter insert is given a totally symmetrical diamond shape, so as to have four wedge shaped operative quarters, and can be indexed four times in use.

It is, therefore, a general object of the invention to provide a skiving type cutting action in an internal disk milling cutter.

It is another object of the invention to provide a new cutter insert shape that can provide a skiving type cutting action.

It is another object of the invention to provide a cutter on which the cutter inserts have an orientation that cooperates with the new insert shape to provide a skiving action while creating a suitably cylindrical final machined surface.

It is yet another object of the invention to provide such a cutter in which the inserts have a concave upper surface and a pair of coplanar cutting edges that sweep symmetrically back from a forwardmost cutting corner, and in which the insert is oriented on the cutter body such that the cutting corner is on a central plane of the cutter body and such that a plane through the axis of the cutter body perpendicularly bisects the cutting edges, thereby allowing the cutting edges to remain substantially tangent to the workpiece surface as they move through their cutting arc, while the concave upper surface clears the workpiece.

DESCRIPTION OF THE PREFERRED EMBODIMENT

Figure 1:
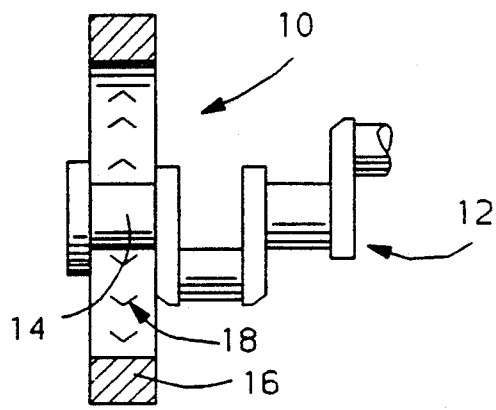
Figure 2A:
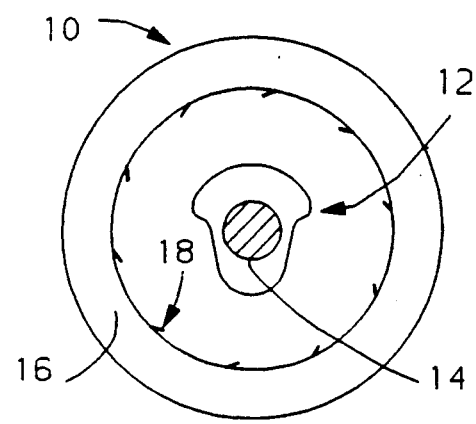
Figure 3:
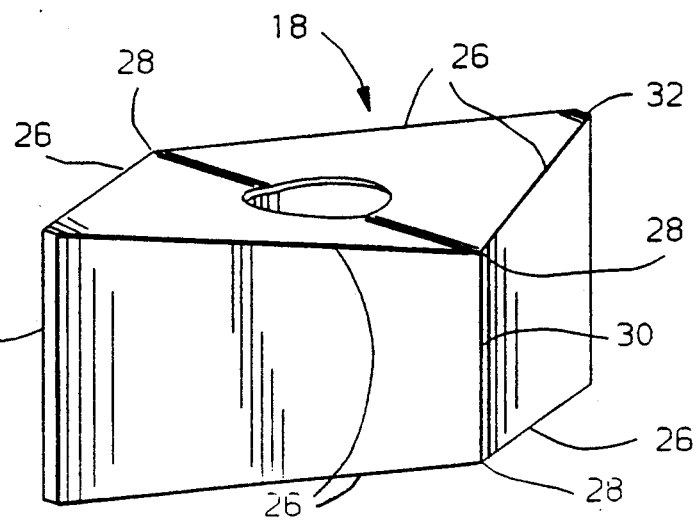
Figure 4:
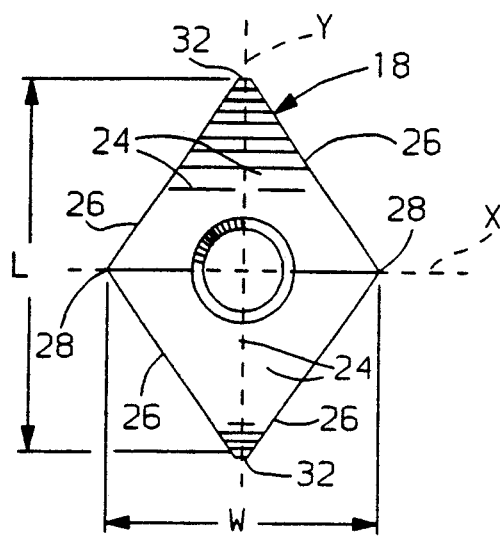
Figure 5:
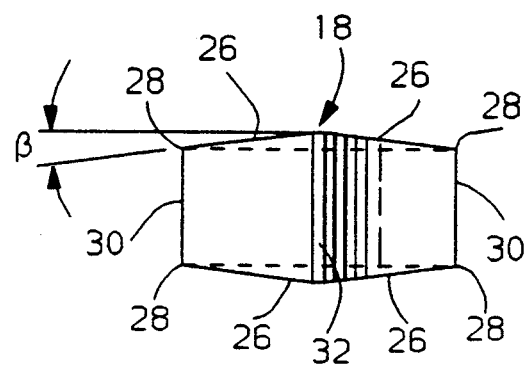
Figure 6:
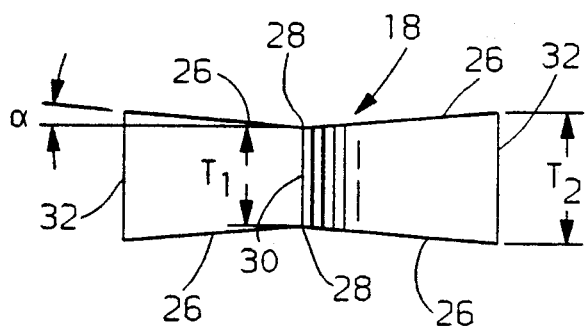
Figure 7:
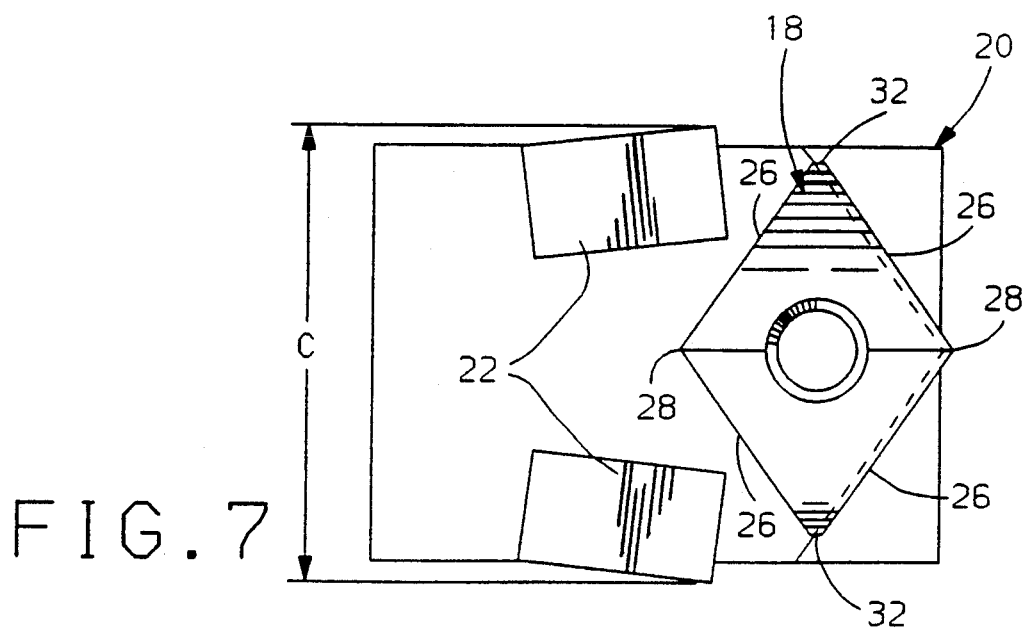
Figures 8, 9:
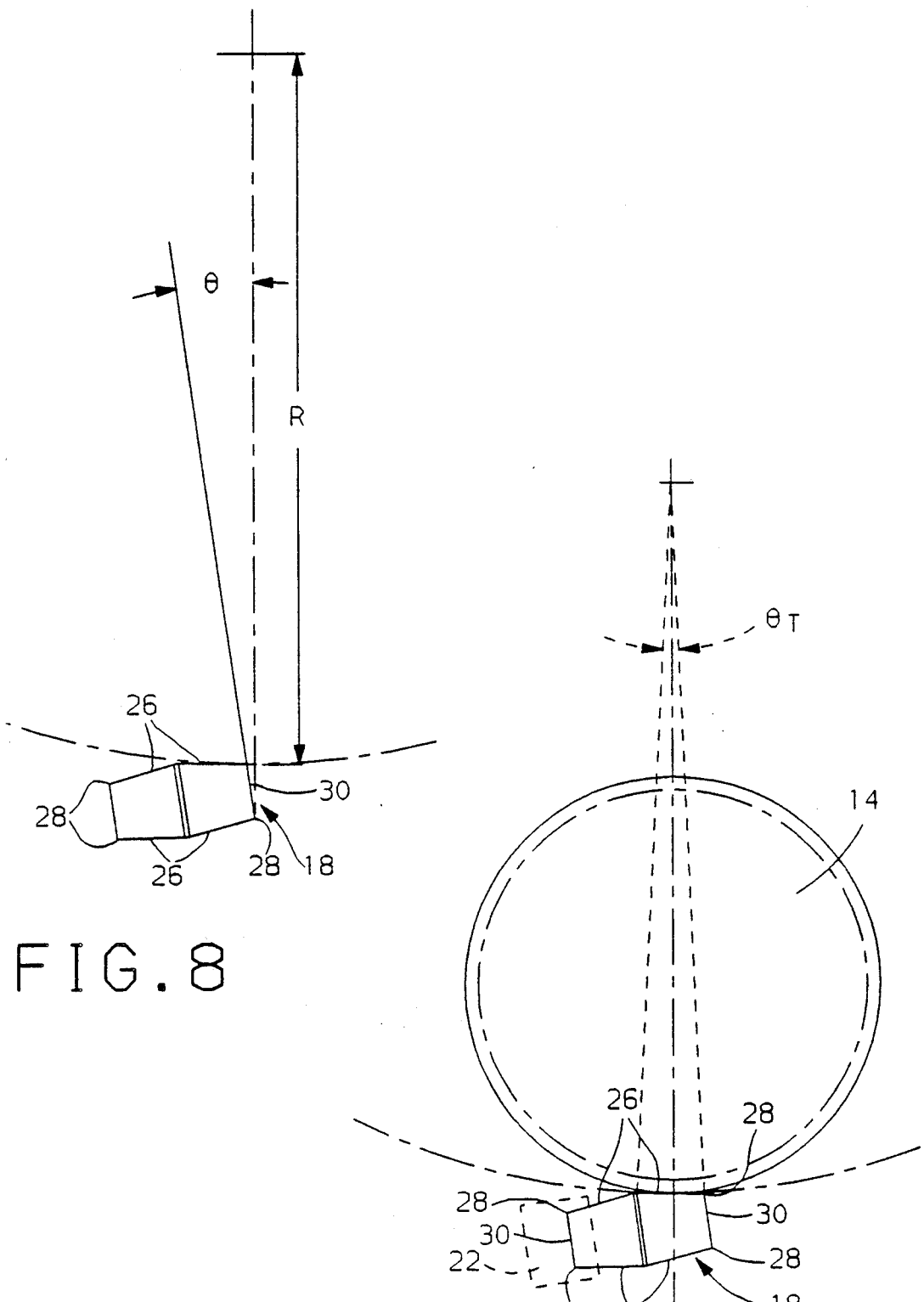
Figure 10:
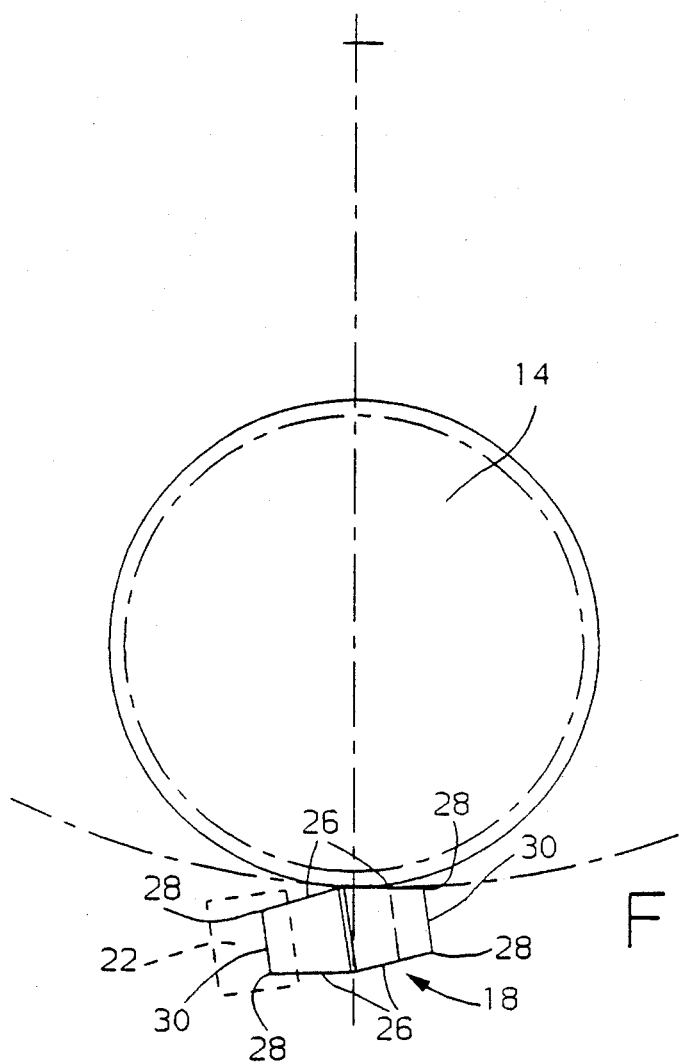
Figure 11:
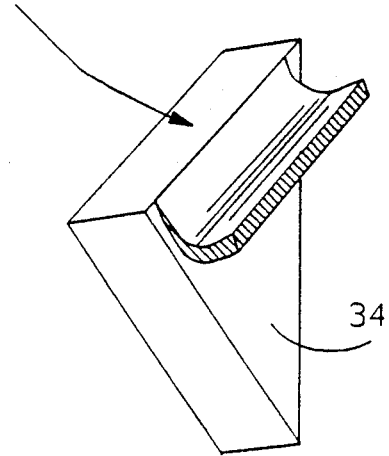
Figure 12:
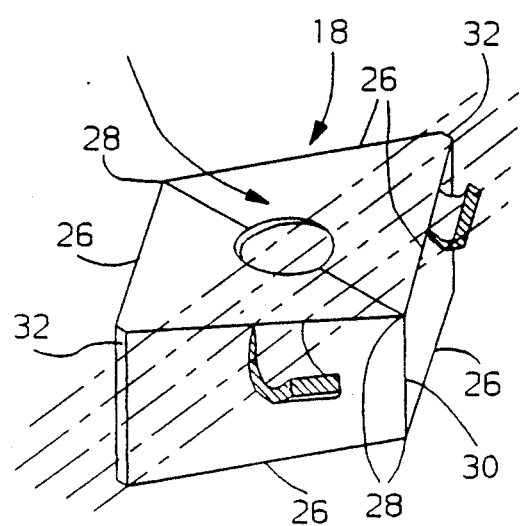

These and other objects and features of the invention will appear from the following written description, and from the drawings, in which:

FIG. 1 is a side view of a workpiece and a cutter incorporating the invention,

FIGS. 2A, B and C illustrate the basic steps in the internal disk milling process, FIG. 3 is a perspective view of a preferred embodiment of the cutter insert of the invention alone, FIG. 4 is a top view of the cutter insert, FIG. 5 is a side view of the cutter insert, FIG. 6 is an end view of the cutter insert, FIG. 7 is a top view of the cutter insert as mounted to the cutter body, FIG. 8 is a side view of the insert as mounted, showing its basic orientation and showing the path of the insert cutting arc, FIG. 9 is a side view of the cutter of the invention in operation during the initial plunge step of the milling process, and when the cutting edges of the insert have moved about half way through their cutting arc, FIG. 10 is a view like FIG. 9, but showing the cutting edges completing the cutting arc, FIG. 11 is a view showing the chip formation of a prior art cutting insert, FIG. 12 is a view showing the chip formation of the invention.

Referring first to FIGS. 1 and 2, the internal disk milling cutter of the invention, designated generally at 10, is used to machine a workpiece, which is a cast iron vehicle crank shaft designated generally at 12. The cylindrical surface to be machined is a main journal 14, which is taken down from a rough diameter of approximately 72.6 mm to 68.6 mm, for a stock thickness removal of about 2.0 mm on each side. The axial length of journal 14 is approximately 23 mm. It will be understood that any cylindrical workpiece surface could be machined. Cutter 10 comprises a generally annular or ring shaped cutter body 16 with an inner diameter considerably larger than journal 14. A plurality of cutter inserts, one of which is designated generally at 18, is mounted to cutter 10 at even circumferential locations, at the same radius, and in an orientation to be described later.

Figure 2B:
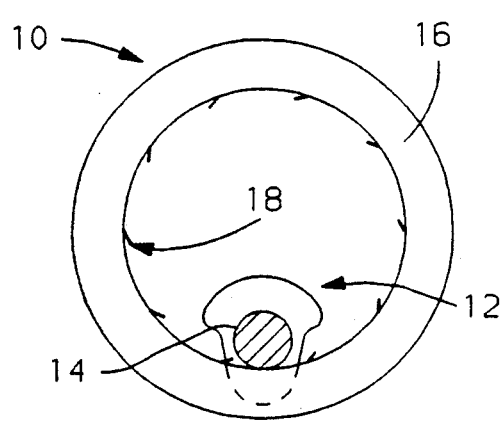
Figure 2C:
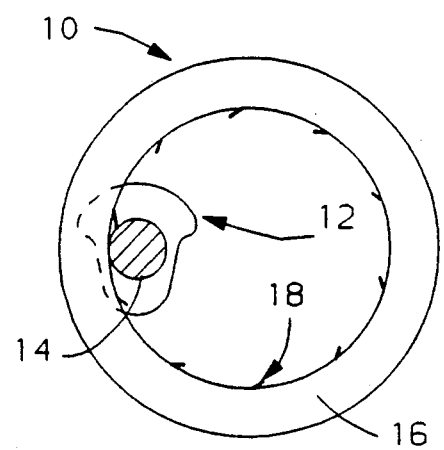

Referring next to FIG. 2, cutter 10 is operated according to conventional internal disk milling principals. As seen in FIG. 2A, crank shaft 12 is first moved through cutter body 16 and stopped when journal 14 is aligned with the inserts 18. Then, cutter body 16 is rapidly spun about its axis by a conventional disk milling machine, not shown. As it spins, the axis of cutter body 16 is kept parallel to the axis of crank shaft 12, and is initially plunged vertically toward crank shaft 12, see FIG. 2B. The plunging operation is stopped when the cutter 10 has taken as much of the journal 14 as the path of inserts 18 overlaps down to the finished diameter. Finally, the axis of the still spinning cutter body 16 is held at the same distance from the axis of crank shaft 12 and orbited around it once, describing a cylinder, see FIG. 2C. This takes the remainder of journal 14 down to its final, finished diameter. There may be multiple plunging and orbiting operations if the stock thickness to be taken off of journal 14 is large.

Referring next to FIG. 7, the inserts 18, which are generally diamond shaped, are mounted to cutter body 16 by a series of mounting blocks or cartridges 20. Each cartridge 20 includes a series of three inserts mounted thereto by any suitable fastener, including a central insert 18, which cuts the majority of the center of journal 14, and a pair of conventional straight inserts 22. Inserts 22 cut the sides of journal 14 in conventional fashion. The cutting corner to cutting corner separation C of inserts 22, which equals the axial dimension of journal 14, is approximately 23 mm. A total of twenty four cartridges 20 are fixed to the inner surface of cutter body 14 such that all like inserts are evenly circumferentially spaced, at the same radius, and have the same predetermined orientation. The orientation of the inserts 18 may be better explained after their shape is described.

Referring next to FIGS. 3 through 6, insert 18 is formed of carbide or other suitable material, with a centrally located mounting hole. The specific shape of insert 18 is complex, and several views and dimensions are necessary to explain it. However, it is symmetrical about planes through both its width, X, and length, Y, shown by dotted lines in FIGS. 3 and 4, so only one fourth of it need be explained in detail, and only one fourth of it is operative at any given time. From the straight plan view of FIG. 4, insert 18 appears to have a regular diamond shape, with a length L of 19.3 mm and a width W of 14.2 mm. The angles subtended in the plan view of FIG. 4 comprise two obtuse angles of 110 degrees each and two acute angles of 70 degrees. The shape of insert 18 is more complex than appears in FIG. 4, however. Unlike a conventional diamond shaped insert, insert 18 is not of a constant thickness, and its upper (or lower) surface is not flat or planar, but concave. Specifically, one half of the upper surface of insert 18, its operative one quarter, is comprised of two same size triangular surfaces 24 that slope inwardly and down to the central plane X at a shallow angle alpha of 5.6 degrees. The triangular surfaces 24 create at the perimeter of insert 18 a pair of generally V-shaped, coplanar cutting edges 26 that sweep back symmetrically to the plane Y from a forwardmost cutting point or corner 28. As best seen in FIG. 5, the cutting edges 26, though coplanar to one another, do not lie in a plane normal to the X and Y plane, but form instead a small angle beta of 4.6 degrees, the purpose of which is described below. Finally, insert 18 does not have a single, constant thickness. It has a constant thickness down the plane X, which is shown as T1 measured at its end edges 30, of 6.35 mm, and a linearly varying thickness in the Y plane that varies from a minimum of 6.35 mm where the Y plane intersects the X plane to a maximum T2 at its side edges 32 of 8.25 mm. The description just given holds true for the other three quarters of insert 18, since it is completely symmetrical. So, there are four such wedge or plow shaped quarters, each comprising a pair of cutting edges 26 and a cutting corner 28.

Referring next to FIG. 8, the purpose for the complex shape of insert 18 may be best understood after describing its orientation on cutter body 16, as the two features of insert shape and orientation cooperate to give the improved cutting operation. The ring shaped cutter body 16, though not specifically illustrated, may be thought of as having a central plane normal to its axis and bisecting it, which would be the plane of the page. It may also be thought of as having a radial plane that includes its axis, normal to the plane of the page, which is represented by the vertical dotted line. Of course, there are any number of such radial planes through the center axis of cutter body 16. Each insert 18 is mounted to cutter body 16 such that its cutting corner 28 is at a radius R of 125.85 mm and lies in the central plane, and such that its front edge 30 creates an angle theta of 8 degrees with a radial plane of the cutter body 14. Each straight insert 22 follows a lead insert 18 with its cutting corner at the same radius, and tipped back at any desired clearance angle. Those skilled in the art will recognize that, given the size and shape of insert 18 as described, and given R and theta, its position and orientation on the cutter body 16 are completely determined. R, of course, is simply made as large as the limitations of cutter body size and milling machine size and cost will allow. A better understanding of the underlying design philosophy of the invention may be had if the factors that determine theta are explained, and that may be better explained after the basic operation of the cutter insert 18 has been described.

Referring next to FIG. 9, the first insert 18 to contact the journal 14 is shown midway through its cutting contact, and at the very beginning of the initial plunge operation described above. The straight inserts 22 are shown in dotted lines. The finished diameter of journal 14 is also shown in dotted lines. As the cutter 16 body is spun about its axis, each insert 18 will move in a circular path of radius R, shown by the large dotted circular line. The cutting edges 26 will contact and cut the surface of journal 14 over a short arc where their path overlaps the journal surface 14, which may be called their cutting arc. The degree of that overlap depends on the distance of cutter body 16 axis from the axis of the journal 14. At any point in time during the cutting arc, only a small portion of each cutting edge 26 will actually physically contact the cut surface of journal 14, which may be referred to as the active portion of the cutting edges 26. The size of that active portion will depend on the relative size of R and the journal 14.

Referring next to FIGS. 11 and 12, as they move in the cutting arc, the cutting edges 26 in effect rock or pivot around the cut surface. This has been illustrated in FIG. 12 by a series of dotted lines which represent equal intervals of time over the cutting arc. The forward corner 28 will engage the cut surface of journal 14 first, followed by successive action portions of the trailing cutting edges 26. This gives the skiving cutting action desired, cutting a long, thin continuous chip and plowing the cut metal to either side. The cutting forces are low, and act symmetrically on the insert 18. The concavity of the insert 18 provided by the shallow angle of the surfaces 24 that trail the cutting edges 26 is sufficient to keep them clear of the cut surface as the edges 26 cut. One piece of that chip corresponding to an active portion of the cutting edges 26 is illustrated in FIG. 12. This may be contrasted to the chip created cut by a conventional insert 34, shown in FIG. 11. The entire edge of insert 34 cuts a wide, high force chip during the entire cutting arc.

Referring next to FIGS. 9 and 10, the factors that determine theta may be explained. As described above, unlike a conventional insert, the orientation of the cutting edges 26 relative to the journal surface 14 will continually change as they rock around the surface being cut. But, to minimize the effect of that arcuate motion, the insert 18 is oriented so that a radial plane of the cutter body 16, that is, a plane that includes the cutter body 16 axis, will substantially perpendicularly bisect the cutting edges 26. This is illustrated in FIG. 9 by a long, thin isocoles triangle having sides of length R, shown in dotted lines, and having a base which is the length of the cutting edges 26 as projected into the central plane of the cutter body 16 (the plane of the page). Then, when the cutting edges 26 are midway through their cutting arc, they will be almost perfectly tangent to the cut surface of journal 14, as shown in FIG. 9. At the end of the cutting arc, as shown in FIG. 10, they will be farther from perfect tangency with the cut surface. The same would hold equally true for the beginning of the cutting arc. But, if so oriented, the cutting edges 26 will be optimally tangent to the cut surface of journal 14 throughout the entire cutting arc. Since the length of the cutting edges 26 as projected into the central plane of the cutter body 14 is fairly small compared to R, the cutting edges 26 stay sufficiently tangent to the cut surface of journal 14 throughout the entire cutting arc so as to create a final cylindrical machined surface that is suitably "flat", or straight sided. This may be contrasted with a conventional diamond shaped insert with flat surfaces, which, even if tipped back at a clearance angle, would dig into the machined surface and leave a V-shaped notch. The optimal theta would be the tip of the isocoles triangle shown, designated $\theta_T$. The optimal $\theta_T$ may be calculated knowing R and the projected length of cutting edge 26. Geometrically, $\theta_T$ may be calculated by bisecting the triangle base with a radial plane of the cutter body 16 to give two right triangles, each with an acute angle that is one half of $\theta_T$. Without repeating the math here, one doing so will find that the ideal $\theta_T$ calculates out to about 3.5 degrees. The theta actually used, 8 degrees, adds an additional four or five degrees clearance angle to assure that the surfaces 24 behind the cutting edges 26 clear the cut surface. While that is a departure from the theoretical optimum, those skilled in the milling art will recognize the addition of an "insurance" clearance angle to the ideal orientation angle as being a standard practice.

Variations of the preferred embodiment may be made. Since only one quarter of the insert 18 is operative at any one time, it could also be constructed so as to have as few as one forwardmost corner 28, one pair of cutting edges 26, and one pair of triangular surfaces 24 behind the cutting edges 26. It is most advantageous to have an indexable insert, of course, but space and packing considerations might dictate a smaller insert. And, despite the rather complex shape of insert 18, it is a shape that lends itself conveniently to creating four operative quarters. That is, the triangular surfaces 24 of each operative quarter are coplanar to those of the adjacent operative quarter, so the insert 18 may be shaped with only two larger triangular surfaces on each upper and lower surface, symmetrical to the X plane, and with the same shallow angle alpha. The same skiving action and optimal tangency throughout the cutting arc could be achieved with an insert in which the cutting edges corresponding to edges 26 were not perfectly straight and V-shaped. For example, the cutting edges might be given a slightly curved or lobate shape, like the edges of a leaf sweeping back from its tip. So long as the cutting edges extend back symmetrically from a forwardmost cutting corner, and so long as the external surface of the insert trailing the cutting edges is made sufficiently concave to clear the cutting edges, then the insert can be optimally oriented on the cutter body as disclosed to give the skiving cutting action desired. Therefore, it will be understood that the invention is not intended to be limited to just the embodiment disclosed.

The embodiments of the invention in which an exclusive property or privilege is claimed are defined as follows:

1. An internal disk milling cutter for machining a cylindrical surface of a workpiece having an axis from a rough to a finished diameter, comprising, a ring shaped cutter body having an axis, a central plane perpendicular to said axis, and a radial plane including said axis, said cutter body being adapted to be operated by spinning about its axis while said cutter body axis is maintained parallel to said workpiece cylindrical surface axis, and, a plurality of generally wedge shaped cutter inserts mounted to said cutter body at substantially evenly spaced circumferential locations, at a radius, and at a predetermined orientation, each of said cutter inserts having a concave upper surface comprised of a pair of same size triangular top faces sloped down continuously at a shallow angle, thereby creating a pair of coplanar straight cutting edges extending back symmetrically from a forwardmost cutting corner, said predetermined cutter insert orientation being such that said radial plane substantially perpendicularly bisects said cutting edges, whereby, when said cutter body is operated, each of said cutting corners contacts said workpiece surface first, followed by said pair of cutting edges, which, by virtue of their predetermined orientation, move substantially tangent to said workpiece surface, while said top faces clear said workpiece surface by virtue of said shallow angle.

2. For use with an internal disk milling cutter of the type that has a ring shaped cutter body with an axis, a central plane perpendicular to said axis, and a radial plane including said axis, and which is adapted to be operated by spinning about its axis while said cutter body axis is maintained parallel to an axis of a workpiece cylindrical surface so as to machine said workpiece surface from a rough to a finished diameter, a generally diamond shaped cutter insert, comprising, four concave external surfaces symmetrically disposed about a plane through the width of said insert and a plane the length of said insert, each of said external surfaces comprised of a pair of same size triangular top faces sloped continuously down at a shallow angle to said insert width plane, thereby creating a pair of coplanar straight cutting edges extending back symmetrically from a forwardmost cutting corner, whereby, when said cutter insert is mounted to said cutter body with said cutting corner located in said cutter body central plane, and in an orientation such that said cutter body radial plane substantially perpendicularly bisects said cutting edges, and said cutter body is operated, each of said cutting corners contacts said workpiece surface first, followed by said pair of cutting edges, which, by virtue of their orientation, move substantially tangent to said workpiece surface, while said top faces clear said workpiece surface by virtue of said shallow angle, and said cutter inserts may be indexed to present any of said four cutting corners and pairs of cutting edges to said workpiece.

3. An internal disk milling cutter for machining a cylindrical surface of a workpiece having an axis from a rough to a finished diameter, comprising, a ring shaped cutter body having an axis, a central plane perpendicular to said axis, and a radial plane including said axis, said cutter body being adapted to be operated by spinning about its axis while its axis is maintained parallel to said workpiece cylindrical surface axis, and, a plurality of generally plow shaped cutter inserts, each of said inserts having a plane through its width and a plane through its length and being symmetrical to each of said planes, each insert further including a concave external surface the perimeter of which creates a cutting corner and pair of coplanar cutting edges that slope continuously upwardly from said cutting corner when viewed in a direction perpendicular to said length plane, each of said inserts further being oriented on said cutter body with said cutting corner disposed forwardmost and in said cutter body central plane, and with said cutting edges substantially perpendicularly bisected by said cutter body radial plane, whereby, when said cutter body is operated, each of said cutting corners contacts said workpiece surface first, followed by said pair of cutting edges, which, by virtue of said orientation, move substantially tangent to said workpiece surface as they cut, while said insert concave external surface clears said workpiece surface.

* * * * *